United States Patent [19]
Kumar et al.

[11] Patent Number: 5,588,108
[45] Date of Patent: Dec. 24, 1996

[54] SYSTEM AND METHOD FOR GENERATING GRAPHICS CHARTS

[75] Inventors: Pramathesh Kumar, Mountain View; Matthias Grabiak, Oakland; Ivan Ivanek, Sausalito, all of Calif.

[73] Assignee: Micrografx, Inc., Richardson, Tex.

[21] Appl. No.: 314,041

[22] Filed: Sep. 27, 1994

[51] Int. Cl.⁶ .................................................. G06F 15/00
[52] U.S. Cl. ................................................................ 395/348
[58] Field of Search ........................... 395/133, 159, 395/155, 157, 158, 161

[56] References Cited

U.S. PATENT DOCUMENTS

| | | | |
|---|---|---|---|
| 4,797,836 | 1/1989 | Witek et al. ............................. | 395/152 |
| 4,937,761 | 6/1990 | Hassett .................................... | 395/150 |
| 5,200,740 | 4/1993 | Paxton .................................... | 345/141 |
| 5,214,755 | 5/1993 | Mason ..................................... | 395/147 |
| 5,249,137 | 9/1993 | Wilson et al. .......................... | 364/496 |
| 5,291,587 | 3/1994 | Kodosky et al. ....................... | 395/500 |
| 5,317,681 | 5/1994 | Glassner ................................. | 395/141 |
| 5,333,243 | 7/1994 | Best et al. ............................... | 395/109 |
| 5,337,404 | 8/1994 | Baudelaire et al. .................... | 395/141 |
| 5,361,333 | 11/1994 | Ahlquist, Jr. et al. ................. | 395/142 |
| 5,367,626 | 11/1994 | Morioka et al. ....................... | 395/159 |
| 5,396,590 | 3/1995 | Kreegar .................................. | 395/159 |
| 5,416,890 | 5/1995 | Beretta ................................... | 395/131 |

*Primary Examiner*—Phu K. Nguyen
*Attorney, Agent, or Firm*—Baker & Botts, L.L.P.

[57] ABSTRACT

The program provides the user with chart templates that may be used in generating different types of graphics charts. Each template may be modified by the user and each template has associated with it a set of shapes and predetermined positions for those shapes so that the user can create professional, clean graphics.

28 Claims, 14 Drawing Sheets

SYSTEM AND METHOD FOR GENERATING GRAPHICS CHARTS

TECHNICAL FIELD OF THE INVENTION

This invention relates to the field of graphics computer programs, and more particularly to a system and method for creating graphics.

BACKGROUND OF THE INVENTION

Graphics are the easiest way to communicate information. The creation of graphic layouts or charts has progressed from manual pen and paper generation techniques to computer aided techniques. Previously developed computer graphics programs or applications generally provide clean, professional graphics in a fraction of the time required for hand drawn graphics. Unfortunately, these computer programs can be complicated and may require high-end computer systems in order to run the software program.

Additionally, previously developed computer graphics programs are generally not user friendly. Computer users of these systems may have to spend hours or days practicing with the system before becoming proficient in generating acceptable graphics. Also, many previously developed computer graphics programs may require the user to have artistic abilities in order to generate professional, clean graphics. Persons lacking artistic abilities may find using previously developed computer graphics systems intimidating.

These factors may prevent using graphics to present information when a graphical presentation would be the best way to communicate the information.

SUMMARY OF THE INVENTION

In accordance with the present invention, a user friendly computer graphics system and method are provided that substantially eliminate or reduce disadvantages and problems associated with previously developed graphics systems and methods.

One aspect of the present invention provides a computer graphics program executed by a processor for generating a plurality of types of graphics charts on a computer display. The program includes instructions for generating an adjustable grid associated with each type of graphics chart. Each grid provides placements for text and shapes for each type of graphics chart. The present invention further includes instructions for generating snap zones associated with each grid for controlling the orientation of the shapes and text placed within the grid.

The present graphics system and method provides numerous technical advantages. One technical advantage of the present invention is that is provides a user friendly computer graphics system. The present invention uses intelligent templates and pre-drawn shapes that make creating graphics much simpler and quicker. This can increase the productivity of a person or persons using the present invention.

Another technical advantage of the present invention is that it can be used without extensive training or practice. This allows a user to nearly immediately begin creating professional, clean graphics.

Yet another technical advantage of present invention is that it comprises a computer program that runs on standard or commercially available computer equipment and does not require high-end workstations as may be required for some previously developed computer graphics programs. This maintains the computer platform costs for practicing the present invention relatively low.

BRIEF DESCRIPTION OF THE DRAWINGS

For a more complete understanding of the present invention and advantages thereof, reference is now made to the following description taking in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of the various drawings.

Figure 1:
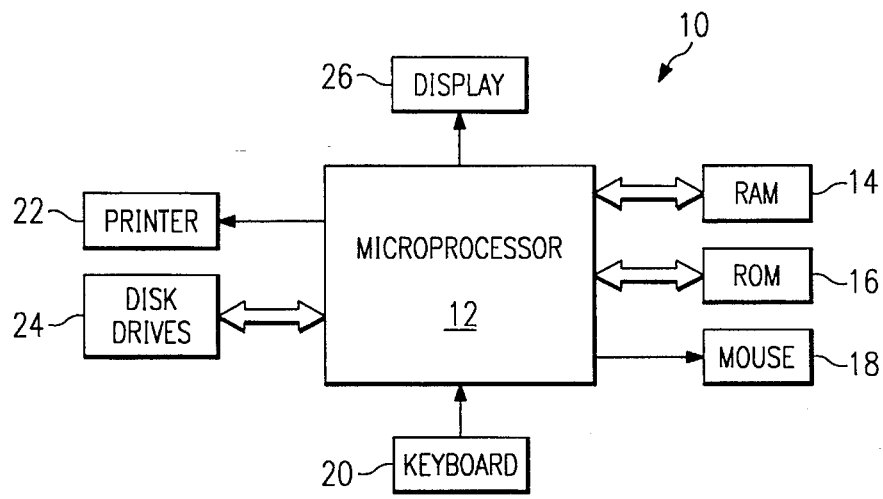
FIG. 1 illustrates a schematic block diagram for a computer system that may be employed in practice of the present invention.

FIG. 1 illustrates computer system 10 for implementing the present invention. Computer system 10 is adapted to execute any of the well-known, MS-DOS, PC-DOS, OS2, MAC-OS™, or Windows™ operating systems. Computer system 10 includes microprocessor 12, random access memory (RAM) 14, read-only memory (ROM) 16, mouse 18, keyboard 20, and output devices, such as printer 22, disc drive 24, and display 26. The present invention provides a software computer program that may be stored in RAM 14, ROM 16, or disk drives 24, that is executed by microprocessor 12. The present invention is adapted for implementation in a computer language such as, for example, C or C++ that may be compiled based on the instructions of the desired computer operating system.

Operation of the present invention is described hereinafter, and where appropriate, in connection with pseudo-code listings. Those of ordinary skill in the art can readily convert the concepts described and represented by the pseudo-code listings into executable computer instructions for implementing the present invention. Computer system 10 can be any computer running, for example, Windows™ 3.1 operating system or higher. Microprocessor 12, in the preferred embodiment, is an 80386™ microprocessor or higher, e.g., 80486™ or Pentium™ microprocessor. Disc drives 24 should have storage capacity on the order of at least 8 megabytes (MB) and RAM 14 should have storage capacity on the order of at least 2 MB, while 4 MB are generally preferred. Display 26 should be a video graphics array (VGA) or have a Windows™ compatible graphics card. The embodiments described above for computer system 10 are provided by way of an example only. Those skilled in the art will appreciate that the implementation of the present invention is not limited to the configuration described.

The present invention provides a computer graphics program that utilizes intelligent templates and pre-drawn shapes to allow a user to quickly and easily create clean and professional looking graphics. The present system anticipates the types of graphics that may be required by the user and provides a number of templates for different graphic layouts or charts so that customized graphics can be created quickly and efficiently. The present invention is currently available as the software package known as ABC SnapGraphics™ available from Micrografx, Inc., of Richardson, Tex.

Figure 2:
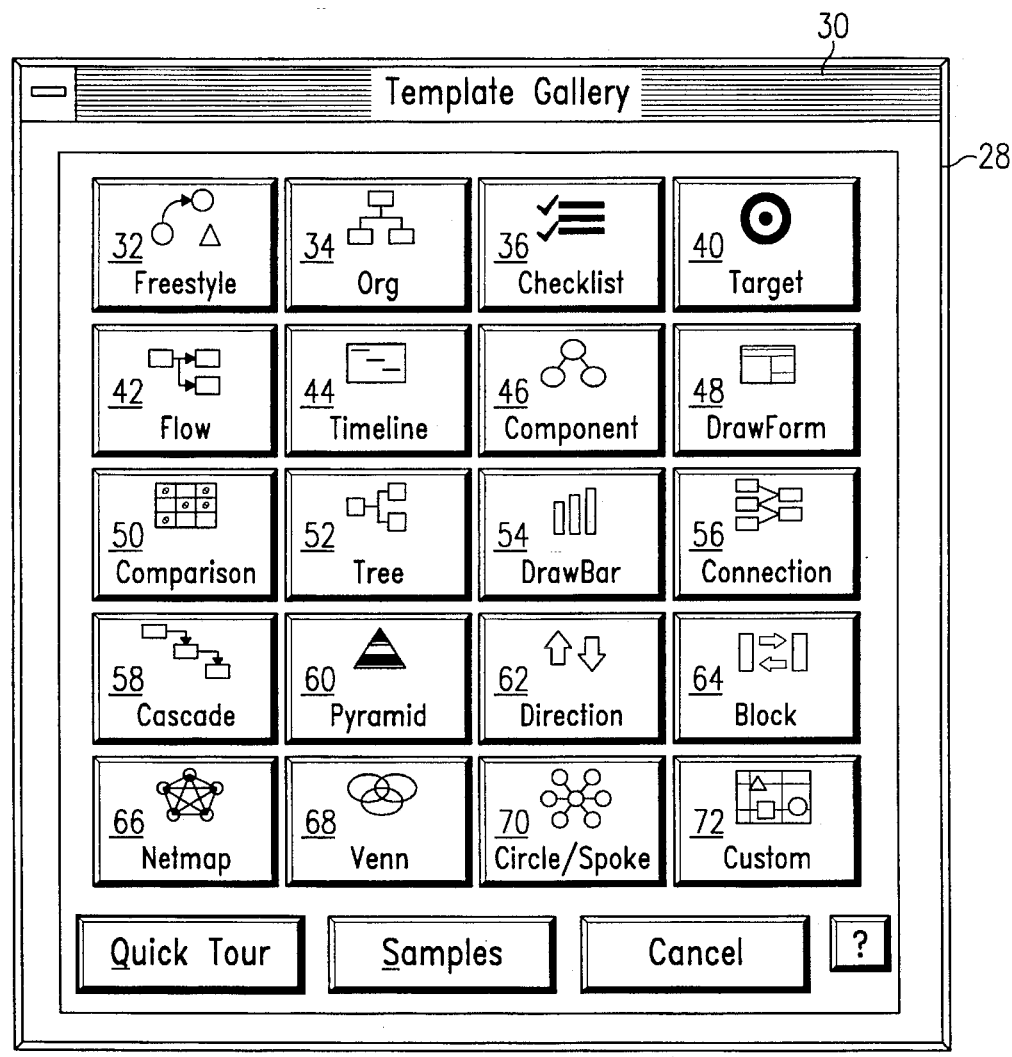
FIG. 2 shows the template gallery dialog box generated in accordance with the present invention.

FIG. 2 illustrates dialog box 28 showing template gallery 30 in accordance with the present invention. When implementing the present invention on computer system 10, system 10 presents template gallery 30 on display 26 for the user to view. Template gallery 30 presents the user of the present invention with a selection of graphics templates that can be used to create graphic layouts or charts. Selection of any one template presents the user with a template chart that includes preset tabs, shapes or a shape palette, tool bars, grids, and snap zones and other elements. Each of these elements will be described in more detail hereinafter.

Template gallery 30 in FIG. 2 includes: freestyle template 32, organizational chart template 34, checklist template 36, target template 40, flow chart template 42, timeline template 44, component template 46, drawform template 48, comparison template 50, tree template 52, drawbar template 54, connection template 56, cascade template 58, pyramid template 60, direction template 62, block template 64, netmap template 66, Venn diagram template 68, circle/spoke template 70, and custom template 72. By using the well known point and click methodology associated with the Windows™ operating system and other graphically based interfaces, the user of the present invention running on computer system 10 can select a template from template gallery 30 on display 26 with mouse 18 to initiate the generation of a graphics chart.

Figure 3:
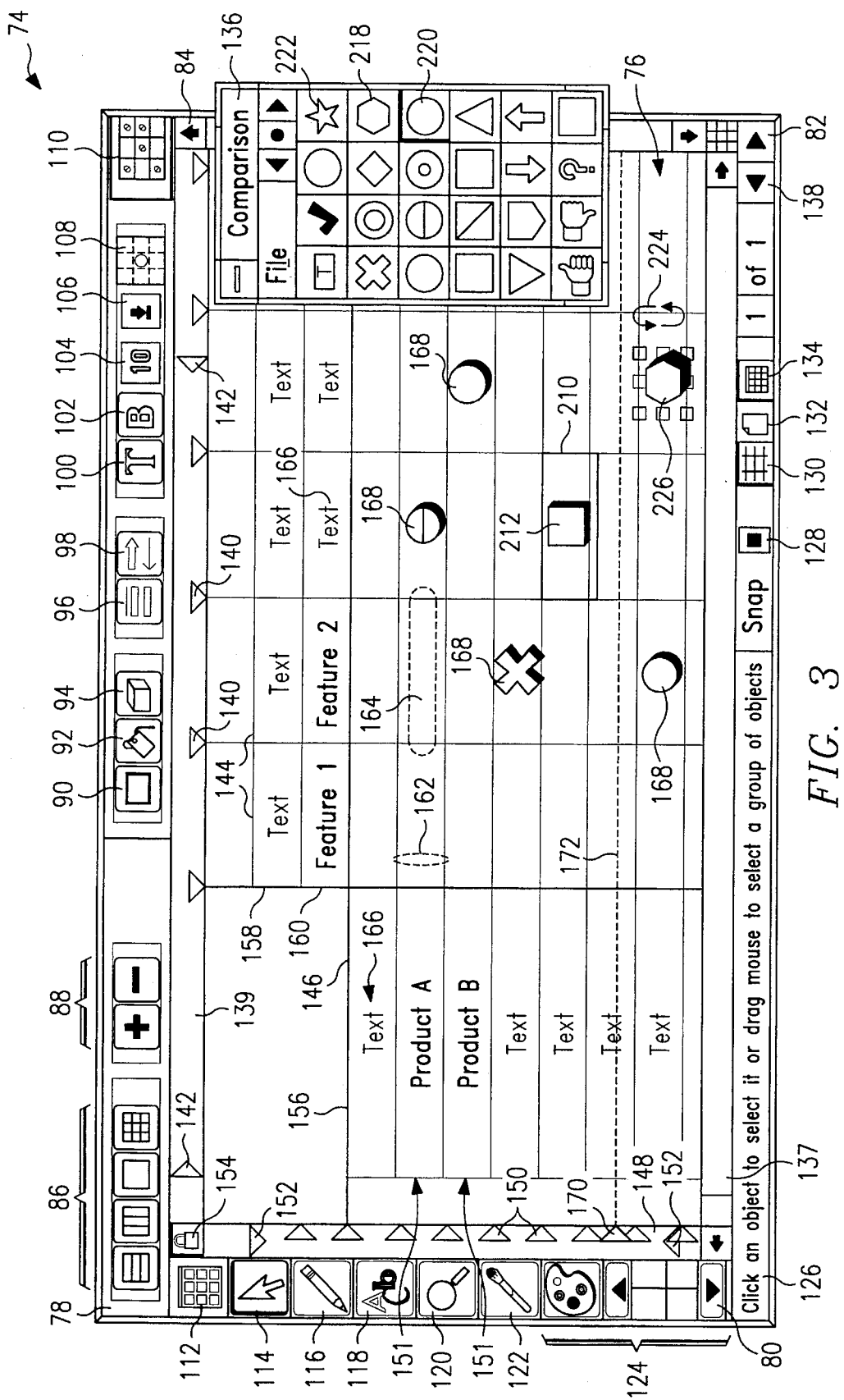
FIG. 3 depicts an exemplary computer screen and graphics chart in accordance with the present invention.

FIG. 3 illustrates example screen 74 on display 26 of computer system 10 when comparison template 50 on template gallery 30 in FIG. 2 is selected by the user. Comparison chart 76 is displayed on display 26 by computer system 10. Comparison chart 76 is bounded by top tool bar 78, left tool bar 80, bottom tool bar 82, and vertical scroll bar 84. Computer system 10 may employ common Windows™ interface techniques in generating screen 74 and to allow the user to select different features and operations for manipulating the information on screen 74. The tool bars and scroll bars aid the user of the present graphics program in preparing a graphics chart.

Top tool bar 78 provides the user with point-and-click access to a number of functions available with the present system. Line draw buttons 86 allow the user to draw various line shapes on screen 74. Each intelligent template, as represented by template gallery 30, has a unique line drawing capability, so line draw buttons 86 for each template may be different. Insert/delete buttons 88 allow the user to insert and delete shapes, rows, or columns into a chart.

Shape border button 90 presents the user with choices for the border of the shapes within chart 76. Shape fill pattern button 92 allows the user to define the pattern that will be used to fill a given shape within chart 76. Three-dimensional and shadow button 94 may be selected to allow the user to define the shadowing and configuration of three-dimensional shapes in comparison chart 76. Line 96 and arrow 98 buttons may be selected to allow the user to select the type of line and arrow to be generated on chart 76, respectively.

Text style button 100 may be selected to present to the user options available for adding text to chart 76. Bold button 102 is selected when the text in chart 76 should be bold. Font size indicator 104 and font select button 106 may be used to select the size and type of the font used in chart 76.

Alignment indicator/select 108 is used to define the alignment of text within a place holder or snap zone. Template indicator 110 corresponds to the icon presented in template gallery 30 for the template selected. Therefore, template select indicator 110 in FIG. 3 corresponds to comparison template 50 in FIG. 2.

Left tool bar 80 also presents the user of the present invention with several settings for chart 76. Left tool bar 80 includes template gallery select button 112 that may be used to return to template gallery 30 at any time while working in the chart shown on display 26. Select button 114 is selected by the user so that shapes or text within chart 76 can be selected and moved or edited. Pencil icon button 116 is selected when the user wishes to draw shapes or lines within chart 76.

Text select button 118 is selected in order to add text to chart 76. View select button 120 is selected to zoom-in or zoom-out within the view of chart 76 presented on display 26.

Eyedropper button 122 is selected to copy style attributes between shapes in chart 76. In order to add color to shapes within chart 76, the user may also click in the lower part of color palette 124. Color palette 124 provides the user with selections for different colors that may be used in chart 76. It is noted that the present system allows numerous colors to be used in generating chart 76 on display 26.

Bottom tool bar 82 of screen 74 includes help hints section 126 that prompts the user of the present invention to a likely next action. Snap off and on button 128 turns the snap feature of the present invention off and on. The snap feature or snap zones will be described in more detail hereinafter. Show or hide template gridlines button 130 is selected by the user in order to display or hide the gridlines within chart 76. Page and grid colors button 132 may be selected by the user in order to present options for the colors displayed on screen 74. Show or hide shape palette button 134 is selected by the user to set whether shape palette 136 is shown on screen 74. Browse buttons 138 allow the user to cycle through the number of charts currently opened at a given time. Located above bottom tool bar 82 is horizontal scroll bar 137 that allows the user to move horizontally in chart 76 while displayed in screen 74.

Horizontal tab ribbon 139 includes a plurality of tabs including inward tabs 140 and ribbon tabs 142. Inward tabs 140 define the size of columns 144, while ribbon tabs 142 define the margins for grid 146 of chart 76. Similarly, vertical tab ribbon 148 includes inward tabs 150 and ribbon tabs 152. Inward tabs 150 define the spacing of rows 151 of grid 146 while ribbon tabs 152 define the margins of grid 146 of chart 76.

The tab settings in either horizontal tab ribbon 139 or vertical tab ribbon 148 can be changed by clicking and dragging any one of the tabs. The present invention also provides slider lock or tab lock button 154 that can be used to lock and unlock the tabs of chart 76. When tab lock 154 is engaged, then moving a single tab, e.g., tab 140 in horizontal tab ribbon 138, causes all of the tabs to be changed by a like amount. The same holds true when tab lock 154 is engaged and a single tab within vertical tab ribbon 148 is moved. Unlocking tab lock 154 allows for individual tabs with a tab ribbon to be moved with respect to the other tabs in the tab ribbon.

Grid 146 presents to the user of chart 76 with a template for the graphics being generated. When the user wishes to generate, for example, a comparison chart, then selecting comparison chart template 50 from template gallery 30 in FIG. 2 results in comparison chart 76 being displayed on display 26. In comparison chart 76, the items being compared can be presented in column 156 with various features presented in rows 158 and 160. Grid 146 has horizontal lines 162 and vertical lines 164 that define grid 146. When chart 76 is first created, grid 146 is presented on screen 76 to aid the user in generating a comparison graphics chart. Grid 146 also includes text insert placeholders 166 that highlight to the user where to insert text into chart 76. Chart 74 also has shapes 168 placed on grid 146.

FIG. 3 has been used to describe a number of the tools and features that may be used in generating a chart or graphics with the present systems. While these tools and features have been described in connection with comparison chart 76, it is understood that the function of these tools and features is not limited to chart 76. One of the advantages of the present system is that it can use the same set of tools or features to generate many different types of graphics.

SLIDEABLE GRIDS

FIG. 3 illustrates the concept of slideable grids that facilitates generating graphics with the present system. Slideable grids allows the user to adjust the grid for a selected template for generating graphics. The grids for each type of chart may be modified by moving the tab controls for the chart. The tab controls are located in two ribbon tabs outside the chart area. To change the grid spacing, a user may click down on one of the tabs and drag it to a new position. For rectangular grids, like grid 146 in FIG. 3, the default mode is to maintain the tab spacing uniform so that when one tab is moved, all the tabs are moved. Tab lock button 154 is provided to change modes so that the spacing of individual rows or columns within grid 146 can be modified. There are also special tabs to change the margins, such as tabs 142 and 152 in FIG. 3.

An example of how the grids of a chart can be changed is shown in FIG. 3. FIG. 3 illustrates tab 170 that is being moved. When tab 170 is selected and dragged upwards or downwards, indication line 172 appears on screen 74. Indication line 172 allows the user to visualize how grid 146 will be changed by the proposed movement of tab 170. Once tab 170 is released by the user, the spacing of grid 146 will change to where 170 is released.

Figure 4:
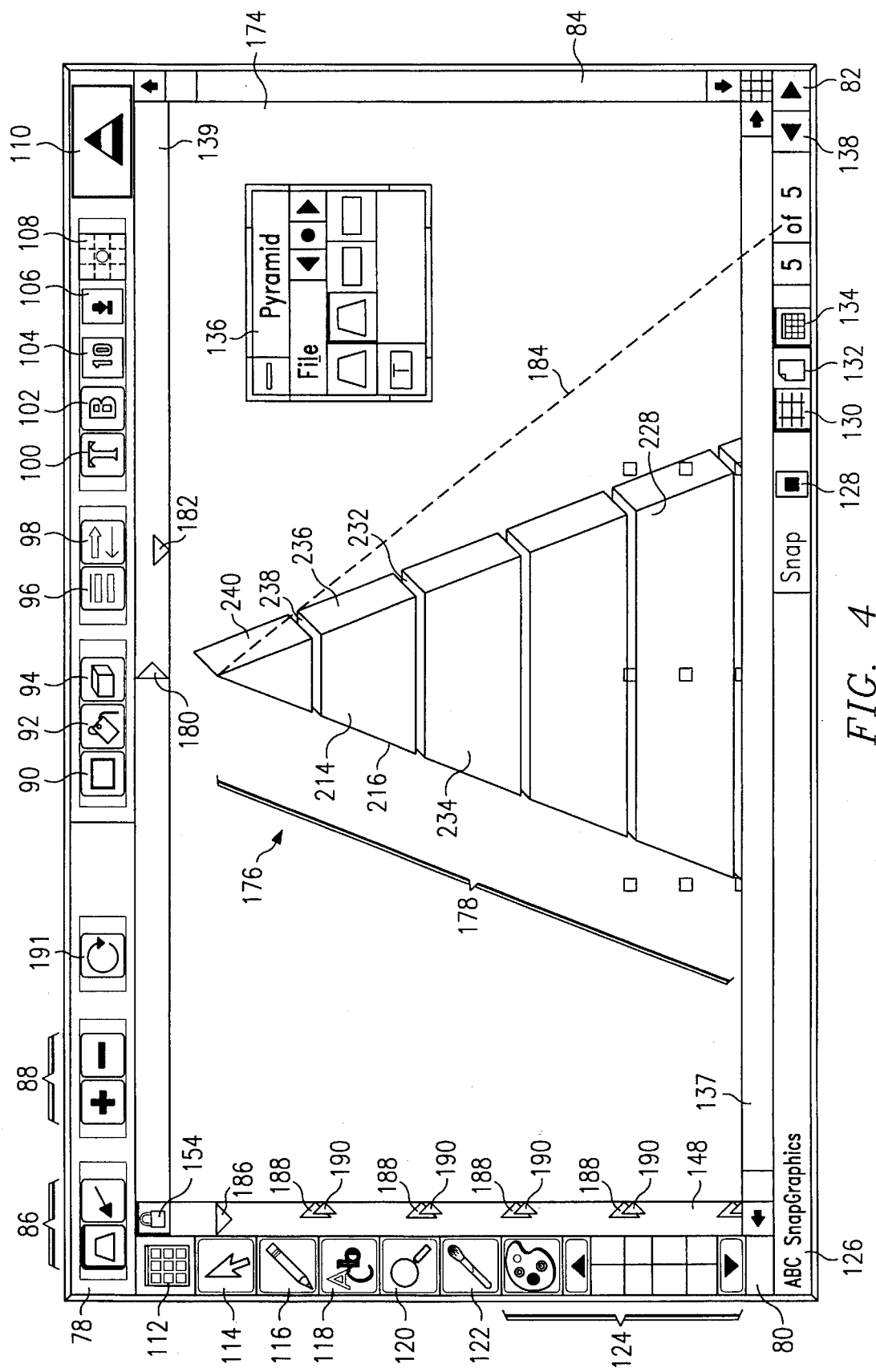
FIG. 4 illustrates a pyramid graphic generated in accordance with the present invention.

FIG. 4 illustrates pyramid chart 174. Pyramid chart 174 displays pyramid 176 including pyramid sections 178. Horizontal tab ribbon 139 of chart 174 includes centering tab 180 and angle tab 182. Moving center tab 180 changes the orientation of triangle 176 within chart 174. Moving angle tab 182 modifies the angle of the sides of pyramid 176. When angle tab 182 is selected and moved, indication line 184 appears so that the user can visualize how the movement of angle tab 182 will affect pyramid 176.

Vertical tab ribbon 148 for pyramid chart 174 includes ribbon tab 186 that defines the top of pyramid 176. Inward tabs 188 and 190 define the spacing between pyramid sections 178. Therefore, increasing the separation between tabs 188 and 190 increases the spacing between pyramid sections 178 of pyramid 176.

Pyramid chart 174 also illustrates an additional tool not previously described in discussions related to FIG. 3. Flip button 191 in top tool bar 78 can be toggled to flip pyramid 76 in FIG. 4. Some of the other templates provided with the present system also provide flip button 191.

Figure 5:
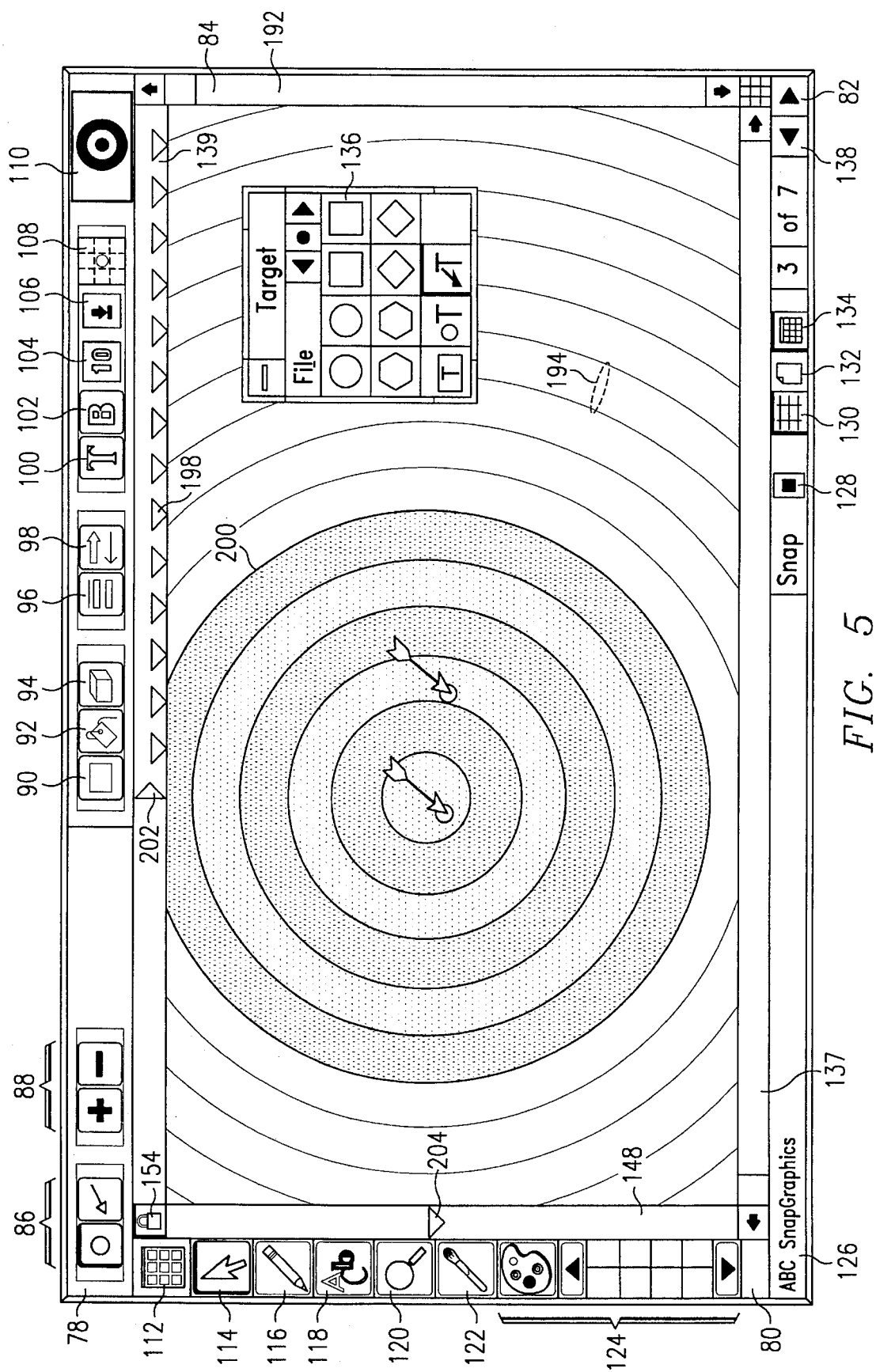
FIG. 5 illustrates a target graphic generated in accordance with the present invention.

Another type of slideable grid available with the present invention is shown in FIG. 5. FIG. 5 illustrates target chart 192 that may be generated in accordance with the present invention. Target chart 192 may be displayed on display 26 of computer system 10 by selecting target template 40 from template gallery 30 of FIG. 2. Selecting target template 40 presents the user with target chart 192 having a grid with a plurality of concentric circles 194. Concentric circles 194 may be filled by selecting shapes from shape palette 136 and placing the shapes in concentric circles 194.

The size of concentric circles 194 in the grid of target chart 192 are controlled by inward tabs 198 in horizontal tab ribbon 138. Moving, for example, inward tab 198 can increase or decrease the diameter of concentric circles 194. The position of target 200 within chart 192 is controlled by horizontal tab 202 and vertical tab 204. By moving the tabs of chart 152 the grid of chart 192 can be easily modified to the desired shape for the target chart being created.

The slidable grid function integrates the concept of an adjustable grid with graphics. By making the grids for each template adjustable, the templates available with the present invention can be easily tailored by the user to generate custom graphics charts. Pseudo-code for implementing slidable grids may be found under Table I below.

TABLE I

Slidable Grids

If user clicks down on tab in tab ribbon
  BEGIN
    if Slider Lock button is pressed
      Select all tabs
    Else
      Select single tab that was clicked
    While mouse is dragged (pressed down
    and moved)
      Give feedback how grid would change
      by displaying auxiliary lines or
      curves in chart
    When mouse is released
      BEGIN
      if Slider Lock button is pressed
        Update all grid lines
      Else
        Update single grid line spacing
        from previous tab to current tab
        Loop through all lines and
        shapes to update their current
        positions

TABLE I-continued

Slidable Grids

Repaint entire chart to display
new grid and new shape and line
positions
END
END

SNAP ZONES

Snap zones or place holders are areas on a chart predesignated for placing shapes on the chart. Snap zones ensure that a shape is placed on the chart in a location and orientation with the other shapes on the chart that gives the chart a professional, clean look. When mouse 18 is used to select a shape to be placed in a snap zone on a chart, the position of the shape in the snap zone is automatically adjusted to the preset position in the snap zone depending on the shape snap type. The preset positions for a snap zone may be, for example, centered, left justified, top aligned, or button aligned. Shapes may have independent horizontal and vertical snapping attributes. The shape of a snap zone may be modified by changing the slidable grid for the chart. Shapes previously placed in a snap zone are automatically adjusted to the new grid spacing and snap zones. Additionally, for some snap zones, shapes placed in the snap zone will be automatically sized to fill the entire snap zone. Different templates have different shapes and positioning snap zones depending on the anticipated placement of shapes within the chart.

Returning to FIG. 3, comparison chart 76 uses snap zones to help in creating chart 76. Each block in grid 146 of chart 76 represents a snap zone. For example, snap zone 210 in chart 76 has been highlighted to illustrate a typical snap zone defined by grid 146 in chart 76. Square shape 212 has been placed within snap zone 210 and is perfectly centered within snap zone 210. Comparison template 50 automatically sets the positioning of shapes within the snap zones of grid 146 to the center of each snap zone. This default positioning within snap zones is preset because shapes placed within a comparison chart, like chart 76, are generally centered in the blocks of grid 146 in order to prepare a professional looking chart.

It is noted that if the user desires to override the preset snap zones, for example, place a shape in chart 76 off-center a block in grid 146, then snap zone off and on button 128 can be toggled turning off the snap zones within grid 146. This allows a user of the present system to place a shape anywhere on grid 146 without automatically snapping the shape to the center of one of the blocks in grid 146.

Figure 6:
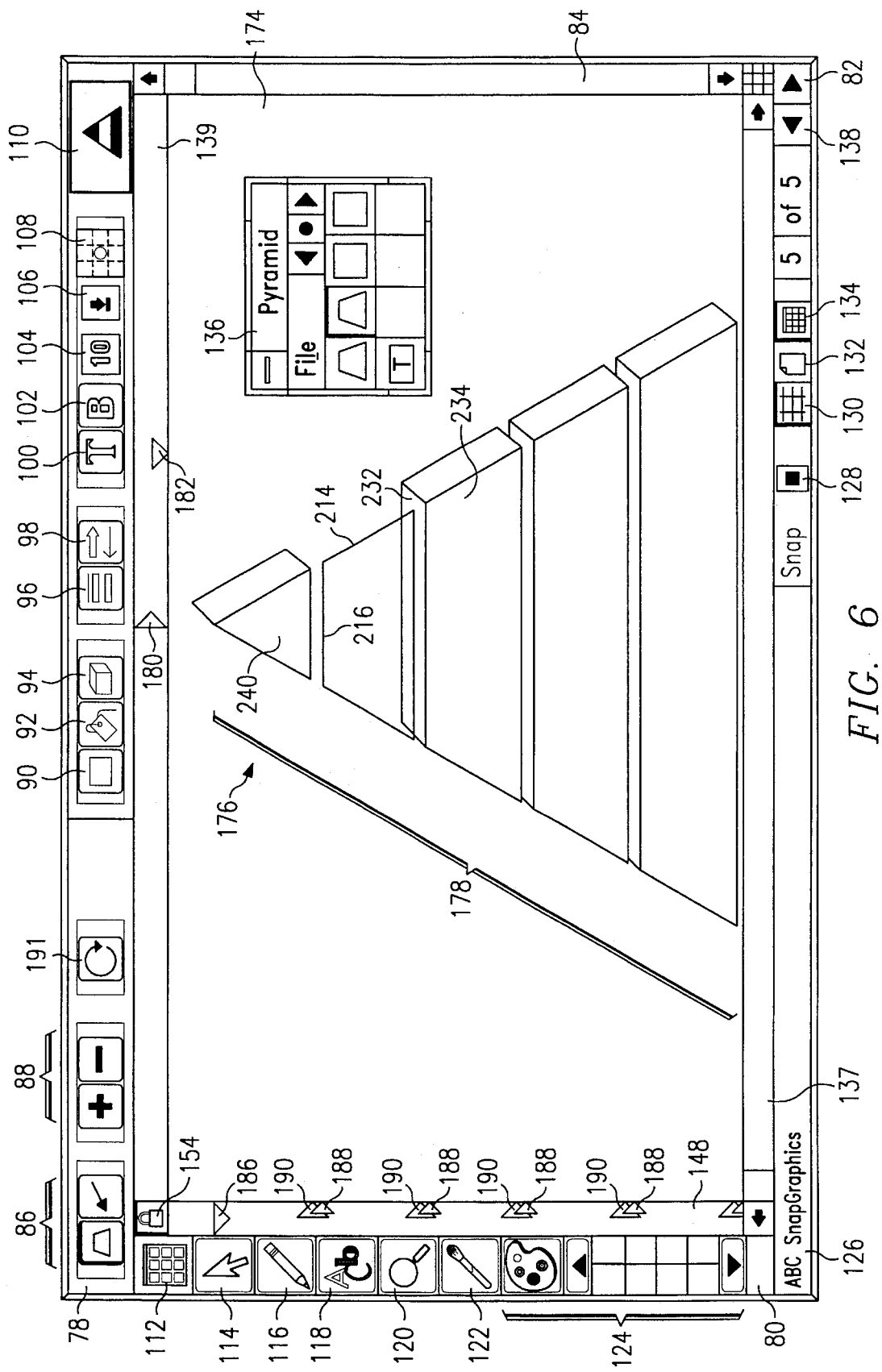
FIG. 6 illustrates in process the pyramid graphic from FIG. 4 in accordance with the present invention.

FIG. 6 illustrates pyramid chart 174 of FIG. 4 prior to placement of all pyramid sections 178 of pyramid 176. Pyramid sections 178 are chosen from shape palette 136 and placed on pyramid 176. As shown in FIG. 6, second section 214 of pyramid 176 has still not been filled with an appropriate shape. Chart 174 does show snap zone 216 outlined by a dark line indicating where second section 214 should be placed to complete pyramid 176. Returning to FIG. 4, second section 214 has now been completed by selecting the appropriate shape from shape template 136 and placing the shape in snap zone 216. Pyramid chart 174 in FIG. 6, therefore, illustrates another use for snap zones so that graphics may be quickly and cleanly created in accordance with the present invention.

FIG. 5 also illustrates the use of snap zones in accordance with the present invention to quickly and clearly generate graphics. Concentric circles 194 in target chart 192 represent the snap zones for chart 192. Shapes selected from shape palette 136 automatically snap to concentric circles 194 thereby creating a neat clean target chart. FIGS. 1 through 6 illustrate that snap zones can have many sizes, shapes, and positionings, and that the type of chart dictates the configuration of the snap zones.

CYCLE SELECT

Cycle select is a feature that allows the user to select multiple shapes from a shape palette and to switch easily between the shapes when placing the shapes on a chart. An example of cycle select will be described in referring to comparison chart 76 of FIG. 3. When creating comparison chart 76 the user has many shape choices available on shape palette 136. By simultaneously selecting a number of these shapes, e.g., hexagon 218, octagon 220, and star 222, for placement in chart 76, and using cycle select, these shapes can be quickly and easily placed on chart 76.

Shapes are placed on chart 76 without cycle select by selecting the first shape in shape palette 136 and placing the shape on grid 146. To place the second shape on grid 146 the user must return to shape palette 136 and select the second shape, and so on for the third shape. With cycle select the user can select multiple shapes in shape palette 136 by depressing the "control" (CTRL) key while selecting a shape or range of shapes by holding down the "shift" key. Once cycle select has been activated, the first mouse click in chart 716 will draw one of the selected shapes in the same way shapes are usually drawn. What is different is that when the cursor is over that shape, e.g., hexagon 226 on grid 146, it will change to cycle select indicator 224. Clicking down within shape 226 again will replace that shape by the next selected shape, octagon 220, so that the user can repeatedly click down in the shape until the desired shape appears.

Cycle select provides the advantage of eliminating the need to go back to shape palette 136 every time a different shape is desired.

An example of the pseudo-code that may be used to implement cycle select may be found in Table II below.

TABLE II

Cycle Select

Part I: Shape Palette
When mouse clicked in shape palette over shape icon
If neither Control key nor Shift key pressed
  BEGIN
    Select shape in palette, deselect all
    others
  END
Else if Control key pressed
  BEGIN
    If shape already selected then
      deselect, unless it is the only
      selected shape
    Else
      select shape in addition to already
      selected shapes
  END
Else if Shift key pressed
  BEGIN
    Select range of shapes
  END
Display shape icons that are selected as
pressed down, all others up
Designate shape that was clicked on as the next

TABLE II-continued

Cycle Select

```
        to be drawn
    Switch to shape draw mode
Part II: Shape Draw Mode
While moving mouse
    BEGIN
        If not over shape
            Display shape draw cursor
        Else if over shape
            BEGIN
                If shape under cursor is one
                that is selected in the shape
                palette display cycle select
                cursor
                Else
                    Display other cursor,
                    depending on chart type and
                    draw mode
            END
    END
    When mouse is clicked down
    BEGIN
        If not over shape
            Draw the next shape from the
            palette that is designated to be
            drawn
        Else if over shape
            BEGIN
                If shape selected in the shape
                palette
                    BEGIN
                        Replace shape with next
                        shape from palette that is
                        selected, or by first shape
                        when shape was last
                        selected shape
                        Designate the new shape as
                        the one that will be drawn
                        next
                    END
            ELSE
                Other action
            END
    END
```

INSERT/DELETE BUTTONS

Referring to FIG. 3, insert/delete buttons 88 allow for deleting or adding rows, columns, or snap zones to a chart. To use buttons 88 the user must first select one or more snap zones or place holders in a chart. Alternatively, a shape previously placed on a chart may be selected. Selecting a shape automatically selects the snap zone underneath the selected shape. When the insert button (+) is selected, the user is presented with a dialogue box asking whether to insert rows, columns, or snap zones. When snap zones are to be inserted the user has the choice of moving existing shapes in the chart down or to the left. Deleting shapes or zones by selecting the delete button (−) works in a similar way. Insert/delete button 88, therefore, works similarly to the insert/delete row and column commands available with commercially available spreadsheet programs.

Referring to FIG. 3, in order to insert a row before hexagonal shape 226, shape 226 would first be selected with mouse 18 as shown. Then by selecting one of insert/delete buttons 88, grid 146 is appropriately modified so that a row, column, or shape is inserted into or deleted from grid 146 at hexagonal shape 226.

FIG. 4 also illustrates how insert/delete buttons 86 can be used to insert additional pyramid sections 178 into pyramid 176. By selecting segment 228 and pressing the insert button (+), section 228 would be moved downward opening a new snap zone for placement of another shape. Deleting a pyramid section from pyramid 176 works in a reverse manner by selecting the delete (−) button.

LAYERED THREE-DIMENSIONAL SHAPES

The present invention provides layered three-dimensional shapes so that the order shapes are painted onto a screen is adjusted automatically to the direction of the perspective of their three-dimensional effects. This prevents the sides of one shape from being drawn on top of the face of another shape. FIGS. 4 and 6 illustrate how layered three-dimensional shapes are generated in accordance with the present system.

FIG. 6 illustrates incomplete pyramid 176 on chart 4 having snap zone 216 as yet not filled. In the view of FIG. 6, top 232 of pyramid segment 234 is fully shown because second section 214 has not been filled. Referring to completed pyramid chart 176 in FIG. 4, when segment 236 is placed in snap zone 216, the majority of top 232 of segment 234 is shown appropriately covered by segment 236. Similarly, top 238 of segment 236 does not cover top segment 240, but instead is shown appropriately underneath top segment 240. Snap zone 216 is, therefore, completed without disturbing the proper three-dimensional shading for pyramid chart 174.

Example pseudo-code for layered three-dimensional shapes may be found below in Table III.

TABLE III

```
            Layered Three-Dimensional Shapes
        Paint List: Linked list of shapes to be
          painted, from first to last. When chart is
        painted the program iterates through the paint list.

Function: Insert_By_Perspective
    Iterate through Paint List:
        BEGIN
            Compare shape that is to be inserted
            with current shape to see which one
            has to be painted first, in order for
            the sides or shadows of one shape not
            to paint over the face of the other
            shape by checking the current
            perspective and the relative position
            of the shapes.
            If shape in paint list needs to be
            painted first
                Continue the iteration
            Else if inserted shape has to be
            painted first
                Insert before current shape in paint
                list and end iteration
        END
        If not already inserted
            Insert at the end of the paint list
    To add a new shape:
        Insert_By_Perspective into the Paint List
    To change the perspective of an individual shape:
        Remove from Paint List and
        Insert_By_Perspective
    To change the perspective of all shapes:
        Remove all shapes from the Paint List and do
        Insert_By_Perspective for each one.
```

VENN COLOR MIX

Figure 7:
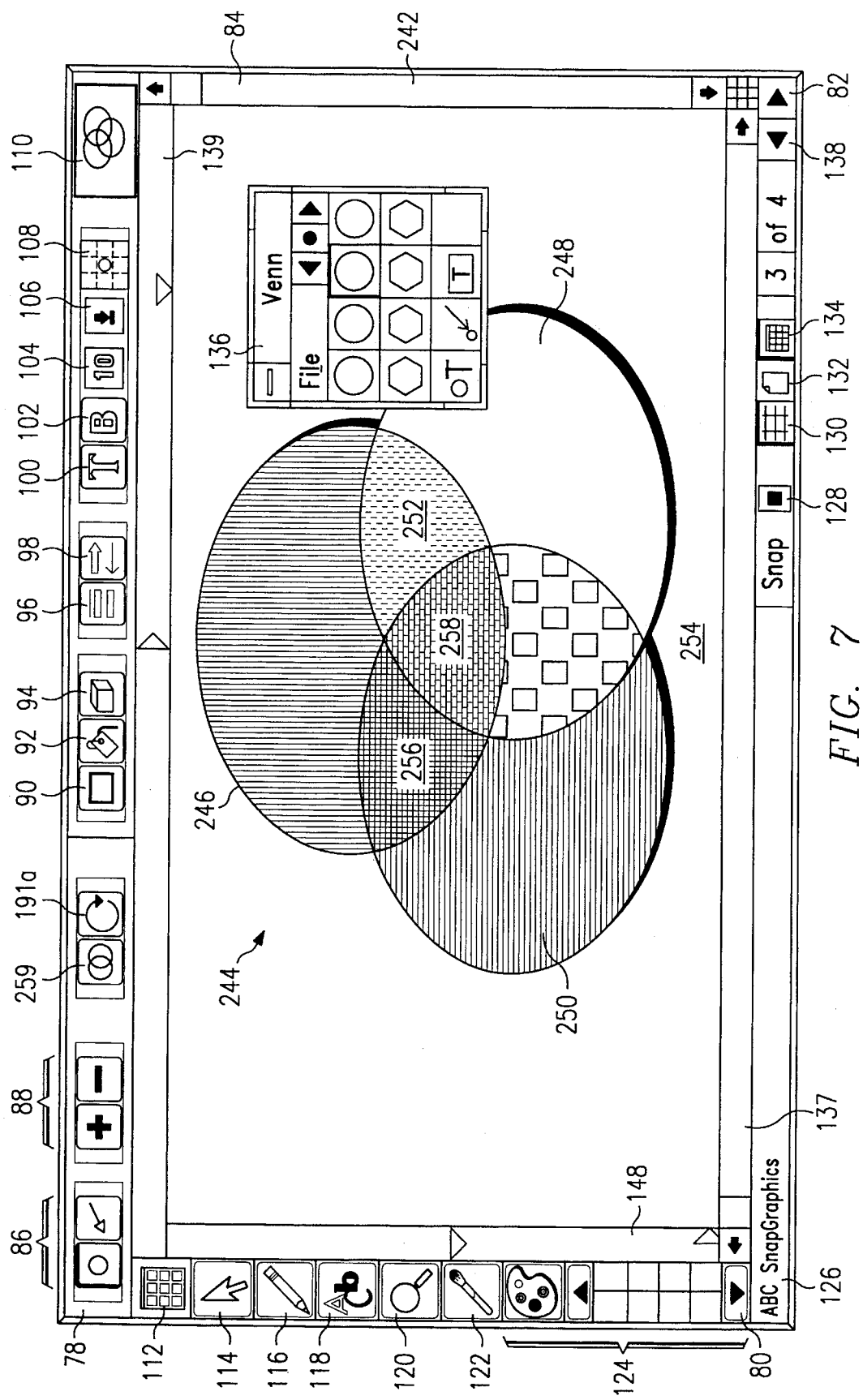
FIG. 7 depicts a Venn diagram graphic in accordance with the present invention.

FIG. 7 shows Venn color chart 242. Venn color chart 242 includes venn diagram 244 having overlapping shapes 246, 248 and 250. Shape 246 overlaps with shape 248 in region 252. Shape 248 overlaps with shape 250 in region 254.

Shape 250 overlaps with shape 246 in region 256. Regions 252, 254 and 256 overlap at region 258.

With shapes drawn in Venn chart 242, the present invention automatically determines the overlapping regions and provides color to the overlapping region that represents the average color of the intersecting shapes in the case where they have different colors. The color value is determined by calculating the average value of the color components in the HSB color model. When shapes of equal color intersect, the user has a choice of making the intersection lighter or darker. Hue and saturation of the intersection of shapes having the same color will be the same as those of the intersecting shapes. For gray color schemes, such as that depicted in FIG. 7, the color scheme is converted to an appropriate shading pattern by standard techniques.

Venn color mix provides the present invention with the capability to display the actual color that would result from mixing the colors of the shapes. Alternatively, when only a black and white display is available, or when only gray-scale printing capabilities are available, then shading and patterning techniques may be employed so that the overlapping sections of the shapes in Venn diagram 244 are clearly shown.

Venn color chart 242 has some additional features in top tool bar 78 not previously described. Intersection shading button 259 can be selected to change (lighter or darker) the region of intersection between any two shapes. Flip button 191*a* in the Venn color chart of FIG. 7 does not flip the chart, but rather rotates the chart clockwise a predetermined amount each time button 191*a* is selected.

Example pseudo-code for Venn color mix may be found in Table IV below.

TABLE IV

Venn Color Mix

Find all intersections between any combination of shapes.
Sort all of those intersections in a list in such a way that an intersection of a combination of shapes always comes before the intersection of combinations that involve those shapes and additional shapes.
Assign a color to each of the above intersections by taking the color average Hue, Saturation, and Luminosity of all intersecting shapes.
Check if the hue, saturation, and luminosity of the intersection are the same as those of one of the intersecting shapes. If so, then decrease/increase the luminosity by an amount depending on the number of intersection shapes.
Paint all intersections in the list.

DRAW CONNECTED

Figure 8:
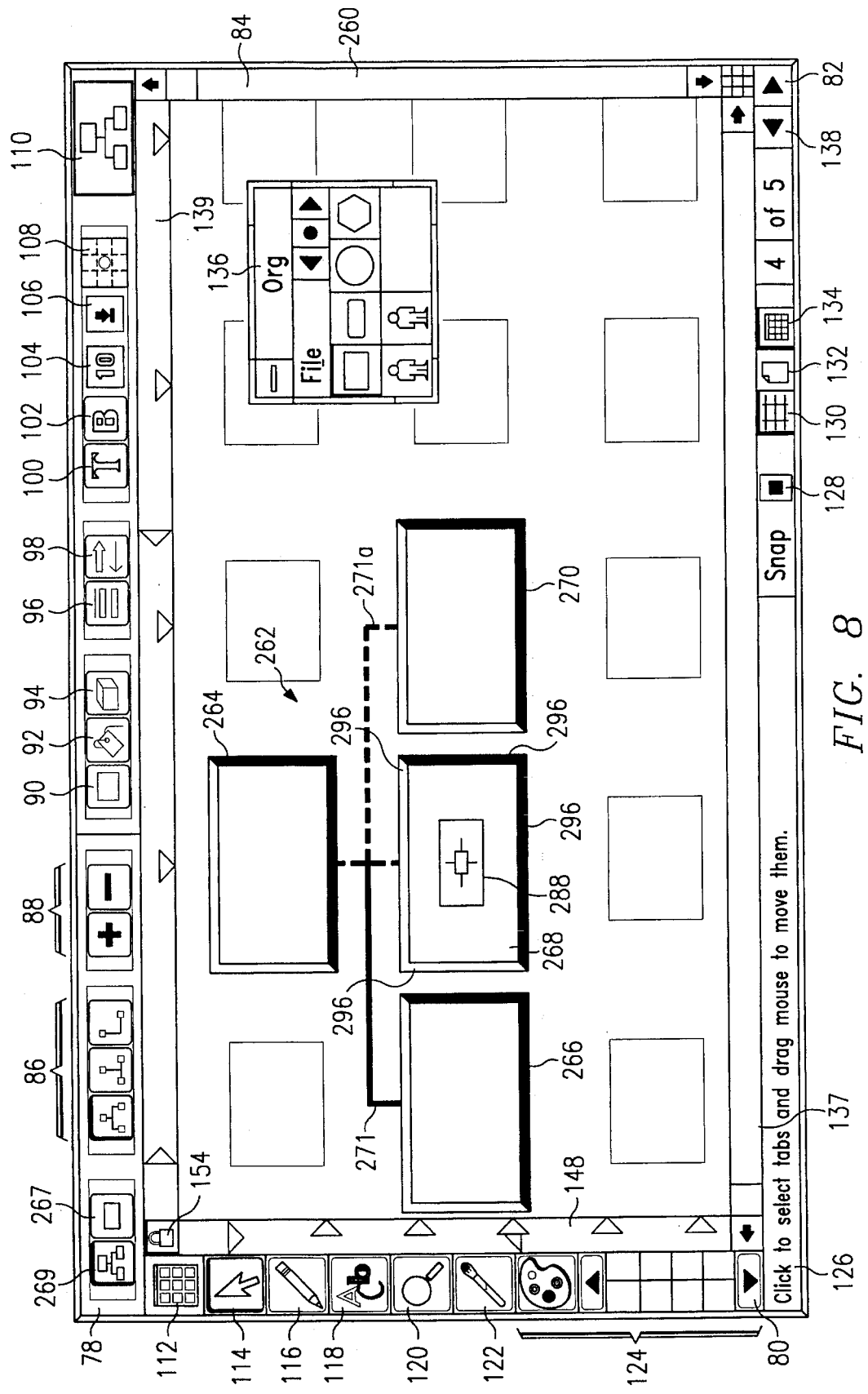
FIG. 8 shows an exemplary organization chart graphic that may be generated in accordance with the present invention.

FIG. 8 illustrates organizational chart 260 that may be generated by selecting organizational chart template 34 from template gallery 30 in FIG. 2. Organizational chart 260 includes chart 262 having shapes 64, 266, 268, and 270. Draw connected allows the user to draw shapes that are automatically connected by lines. It allows creating organizational charts and other charts with a minimal number of mouse clicks.

To initiate draw connected shapes, the user selects draw connected button 269 in top tool bar 78 and selects a shape in shape palette 136 and then clicks in the chart once to create the initial shape as the "anchor shape," for example, shape 264 in chart 262. All following mouse clicks in the chart will create shapes that are automatically connected to the anchor shape. For example, with shape 264 as the anchor shape, clicking in chart 260 automatically creates shapes 266, 268, and 290 coupled to shape 264 by line 271.

Before clicking down on chart 260, the present system will also display an auxiliary line indicating the line routing that will be used to connect to a new shape to the anchor shape. The auxiliary line starts from the anchor shape and ends at the current mouse point where the new shape will be created when the mouse is clicked. The auxiliary line is automatically updated whenever the mouse is moved. For example, prior to placing shape 270 coupled to anchor shape 264, auxiliary line 271*a* will be shown on chart 262 indicating the proposed routing of the line connecting shapes 262 and 270.

Once a number of connected shapes are drawn, a new shape can be selected as the anchor shape by clicking down on it. Clicking in the current anchor shape will finish the drawing of connected shapes allowing the user to either start again from the beginning or start connected drawing by clicking in an existing shape initiating a new anchor shape. To draw shapes in chart 260 with the automatic draw connected feature inactivated, the user selects draw shapes button 267 in top tool bar 78.

Example pseudo-code for draw connected may be found in Table V below.

TABLE V

Draw Connected

Beginning state:
  anchor shape designated
  variable Change_Anchor set to FALSE
  Line drawing not activated
When mouse clicked in chart outside any existing shape create new shape on mouse and designate new shape as anchor shape
LABEL:
  Display auxiliary line from anchor shape to current mouse point single line or polygon line, depending on current line routing, and update auxiliary line on any mouse move.
  If mouse clicked in anchor shape go to Label_End
  If mouse clicked in other existing shape then
    BEGIN
      connect anchor shape to that shape by a line as indicated by auxiliary line
      If Change_Anchor is TRUE designate clicked shape as new anchor shape
      Set Change_Anchor to FALSE and go to LABEL
    END
  If mouse clicked outside any shape then set Change_Anchor to TRUE, create shape on mouse up at current mouse position, and connect anchor shape and new shape with line, keep anchor shape, and go to Continue at LABEL
Label_End:
  Restore beginning state

LINE ROUTING

Figure 9:
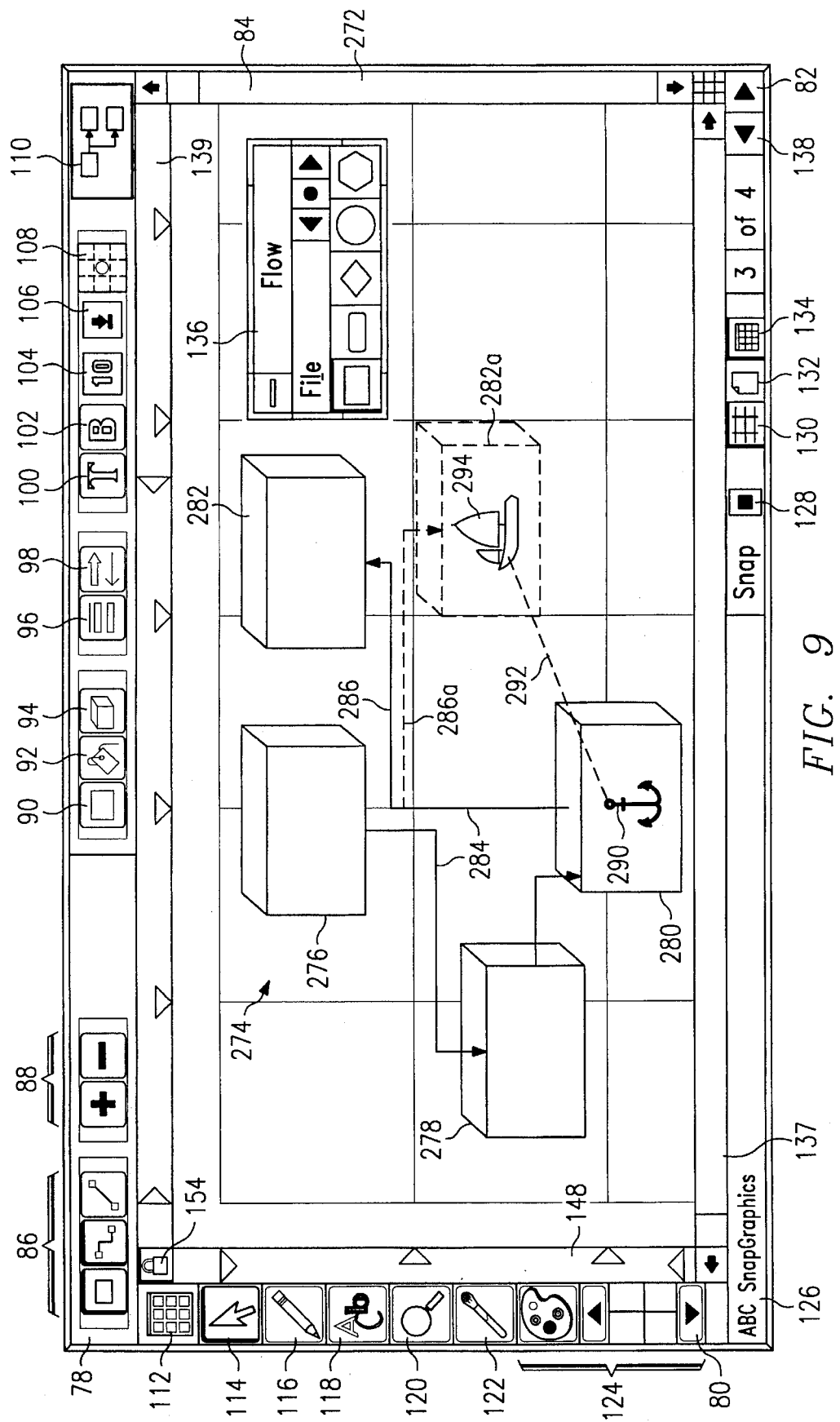
FIG. 9 illustrates a flow chart graphic generated in accordance with the present invention.

The present invention provides for intelligent routing of lines between connected shapes in a chart. FIG. 9 illustrates flow chart 272 that may be initiated by selecting flow chart template 42 in template gallery 30 of FIG. 2. Flow chart 272 includes steps 274, having first step 276, second step 278, third step 280, and fourth step 282. Steps 274 are coupled by flow path 284.

Line routing in accordance with the present invention is done intelligently so that the lines always enter the next connected shape at a logical side. When shapes are moved, the line connecting the shapes is intelligently redrawn by the system such that entrance into the next shape remains logical. Line routing with the present system also automatically modifies the number of segments required to connect two shapes. With intelligent line routing, for example, if shape 282 is moved to the alternate position represented by shape 282a, line 286 between shape 280 and 282 would be redrawn automatically as line 286a as shown in dotted line format in FIG. 9.

The present system provides intelligent and automatic line routing so that lines in the charts created in accordance with the present invention are routed intelligently and automatically redrawn when a shape to which they connect is moved.

LINE ATTACH BUTTON

Returning to FIG. 8, shape 268 has line attach button 288 displayed thereon. Once a shape such as shape 268 has been drawn, the present system senses that the user may wish to draw a line from the existing shape when the mouse pointer is moved over the existing shape. For example, when the pointer goes over existing shape 268, the system automatically shifts to line drawing mode and line attach button 288 appears on shape 268. By clicking down over line attach button 268, a line can be drawn from shape 268 to any of the other shapes in chart 260 without selecting the line drawing feature 86. Alternatively, if the mouse pointer is moved out of shape 268 then line attach button 288 disappears from shape 268.

This feature allows for entering line drawing mode without having to select line draw buttons 86 with the mouse pointer.

ANCHOR AND SHIP LINE INDICATOR

Returning to FIG. 9, flow chart 272 illustrates the anchor and ship line indicator in accordance with the present invention. Anchor and ship icons appear in the chart in line draw mode to indicate from where the line starts (anchor) to where it ends (ship). The user clicks in the first shape to start a line. This causes the system to automatically display an anchor icon in that shape. As the mouse cursor is moved from the anchor shape, an auxiliary line is drawn from the anchor shape to the current mouse point to indicate the line routing that will be used. As soon as the mouse cursor enters the destination shape, the system displays a ship icon in that shape. This indicates that the shape with the ship icon will be connected to the shape with the anchor icon when the left mouse button is clicked down at that destination shape.

For example, anchor icon 290 is shown in shape 280 of chart 272. As the mouse pointer is moved from shape 280 towards shape 282a auxiliary line 292 is drawn by the system. Once the mouse pointer enters shape 282a, ship icon 294 is displayed by the system. Once the mouse pointer is clicked within shape 282a, auxiliary line 292 becomes a permanent line. By this way, a user of the present system can see exactly where a line will begin and end along with the proposed shape for the line prior to setting the line on a chart. Example pseudo-code for anchor and ship line indicators may be found in Table VI below.

TABLE VI

| Anchor and Ship |
| --- |
| If mouse clicked down in center of existing shape in line draw mode<br>  BEGIN<br>    Calculate center of shape and draw<br>    bitmap of anchor in center.<br>    Draw auxiliary line from center of shape<br>    to current mouse position, single line<br>    or polygon line depending on current<br>    line routing<br>    While mouse is moved<br>      BEGIN<br>        If mouse enters another shape then<br>          BEGIN<br>            Erase auxiliary line<br>            Calculate center of that shape<br>            and draw bitmap of ship in the<br>            center of that shape<br>            Display exact outline of line<br>            that will be drawn from the<br>            initial shape to the current<br>            shape if mouse is clicked down<br>        Else<br>          Update auxiliary line<br>    END<br>    When mouse is clicked down in shape<br>      BEGIN<br>        If in anchor shape then end line<br>        drawing<br>        otherwise remove anchor and ship<br>        and draw line as indicated by<br>        auxiliary outline<br>      END<br>  END |

PLAQUE ATTRIBUTE

Shapes in a graphics chart generated in accordance with the present invention can be given a special kind of three-dimensional look by choosing the plaque attribute feature. FIG. 8 illustrates organizational chart 262 with shapes 264, 266, 268 and 270, all having the plaque attribute applied to them. For example, shape 268 has beveled surfaces 296 around its periphery that give shape 268 the appearance of a plaque.

Mathematically, plaque attribute can be understood in the following way. First, the shape is lifted out of the drawing plane in the direction of the viewer. Then, a point is selected above the center of the shape, i.e., towards the viewer. A line is drawn from that point to each of the points of the shape outline and that line is cut-off at the drawing plane. This creates a three-dimensional pyramid shape. The upper part of this pyramid is then cut-off, leaving only the part between the drawing plane and the plane into which the shape has been lifted. To create the illusion of a plaque shape, the present system creates lines parallel to the individual border segments of the two-dimensional shape at a fixed distance on the outside of the shape. These lines are cut-off where they intersect. Line segments are then drawn from the corners of the original shapes to those intersections. This creates the illusion that the shape has sides rather than just borders. Each side is chosen to be either lighter or darker than the shape depending on the direction it is facing. This provides the illusion of having a light source on one side.

Figure 10:
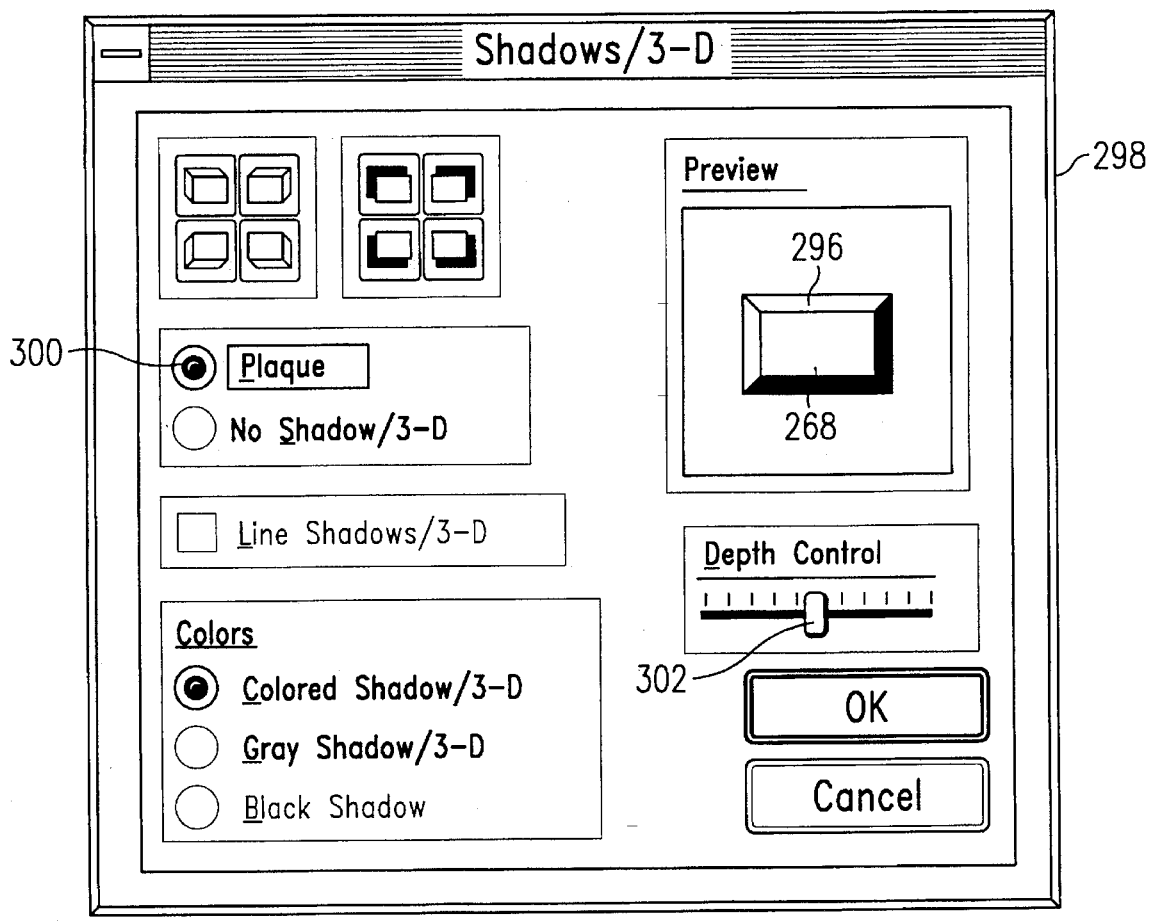
FIG. 10 illustrates a dialog box for controlling the shadows and three-dimensional outline of a shape in accordance with the present invention.

The height or depth of each side can be adjusted by a slider control in a three-dimensional dialogue box. FIG. 10 illustrates a three-dimensional dialogue box 298. Dialog box 298 is accessible by selecting three-dimensional shadow button 94 in top tool bar 78. The plaque attribute for a selected shape is established by selecting plaque check box 300, and the depth of the beveled surfaces for the shape, e.g. surfaces 294 of shape 268 in FIG. 8, is controlled by moving depth control slider 302. Example pseudo-code for generating the plaque attribute may be found in Table VII below.

TABLE VII

Plaque Attribute

To give a flat shape a plaque 3-D look:
Find the outside edges of the shape.
For each edge segment find the line parallel to it at a distance D towards the outside of the shape. Assign a direction in which to loop through those segments.
Cut off each line where it intersects with the line associated with next and previous edge, and also cut off last and first segments where they intersect.
This will give the line segments that determine the outside edge of the full shape.
Connect the endpoints of the edge segments of the original shape's corners with the corresponding points of the corresponding outside line segments determined above. This defines areas that represent the sides of the three-dimensional object to be displayed.
Determine which way each face is facing, 2.e. the direction of a line perpendicular to the inside segment from the inside segment toward the outside segment. If it is facing northeast through southeast to southwest, then paint the side darker than the face of the shape, if it is facing northeast through northwest to southwest than paint it with a lighter color.

TREE MOVE

In charts with hierarchal structure, like organizational charts or tree charts, the user of the present system can move branches within the structure as a unit by clicking on the top shape of a branch and dragging the shape with the mouse before releasing the top shape. For example, referring to FIG. 8, shape 264 in organization chart 262 would be the top shape of organizational chart 262. By clicking on shape 264, all of the shapes within organizational chart 262 can be moved simultaneously by moving shape 264. All the other shapes within chart 262 will move with shape 264.

Example pseudo-code for tree move may be found in Table VIII below.

TABLE VIII

Tree Move

Figure 11:
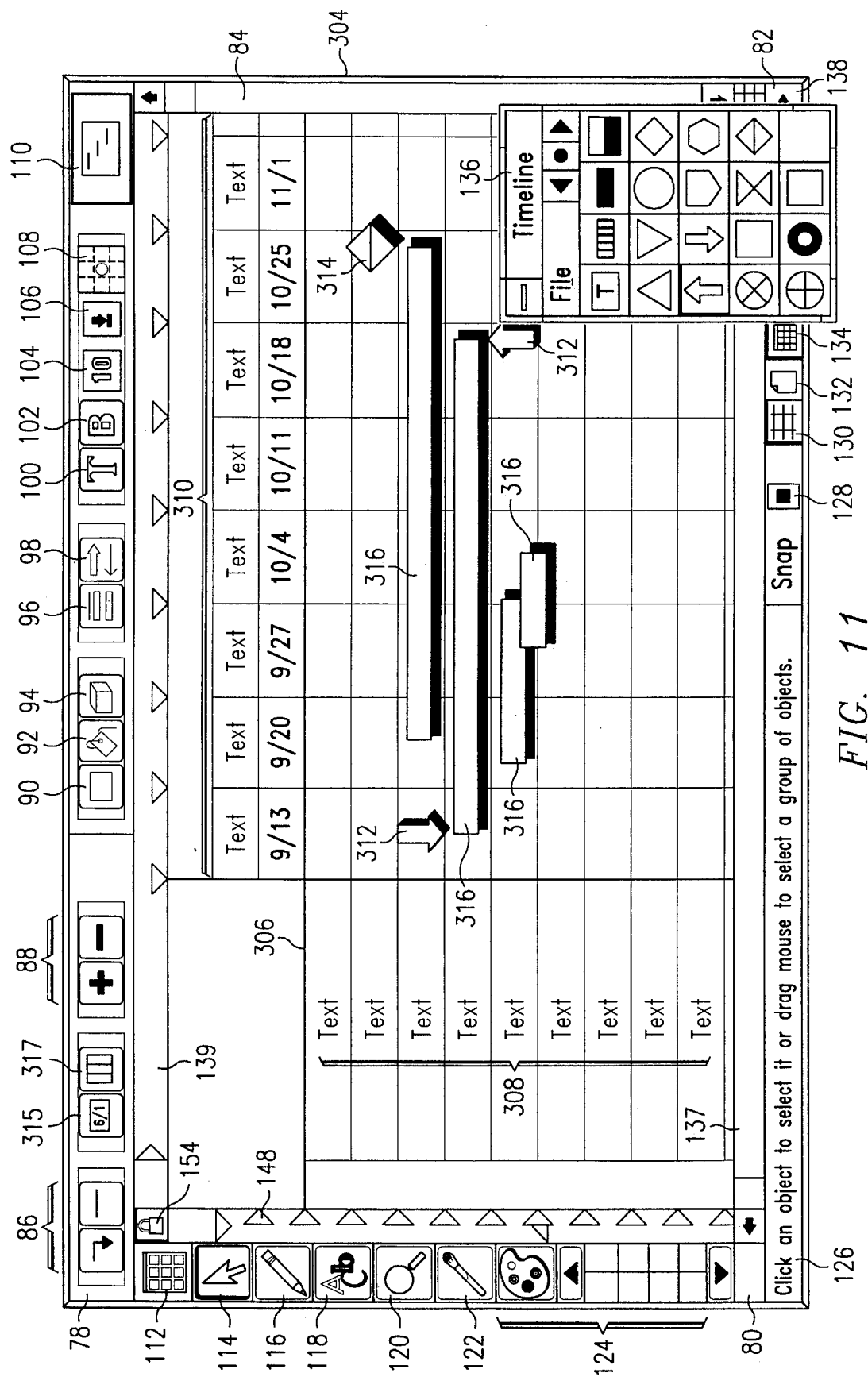
FIG. 11 depicts a time line graphic generated in accordance with the present invention.

If user clicks on shape and starts dragging or holds down the mouse
  BEGIN
    If shape was previously selected
      keep current selection
    else if shape was not selected
      BEGIN
        deselect everything
        select clicked shape and the entire branch, i.e. all shapes that are connected by lines underneath it
      END
  When user releases mouse
    Move all currently selected shapes
END FIG. 11 illustrates timeline chart 304 that may be generated by selecting timeline template 44 from template gallery 30 in FIG. 2. Timeline chart 304 includes grid 306 having vertical and horizontal lines. The boxes defined by grid 306 are snap zones. Text place holders 308 are provided in the first left-hand column of grid 306 and text and date place holders 310 are provided along the top row of grid 306.

Timeline chart 304 in FIG. 11 illustrates many of the inventive concepts previously discussed. Slidable grids are incorporated in grid 306 so that the spacing and shape of grid 306 can be easily modified by manipulating the tabs in tab ribbons 139 and 148. Chart 304 also uses snap zones for placing shapes such as arrows 312, diamond 314, and bars 316 on grid 306. Top tool bar 78 in FIG. 11 includes some additional features not previously described. Date format buttons 315 is selected to change to the date format of the dates shown in date place holders 310. Show/hide dividers button 317 may be selected for showing or hiding grid 306 in chart 304. By using the present system, clear and professional looking timeline charts can be generated quickly and efficiently.

Figure 12:
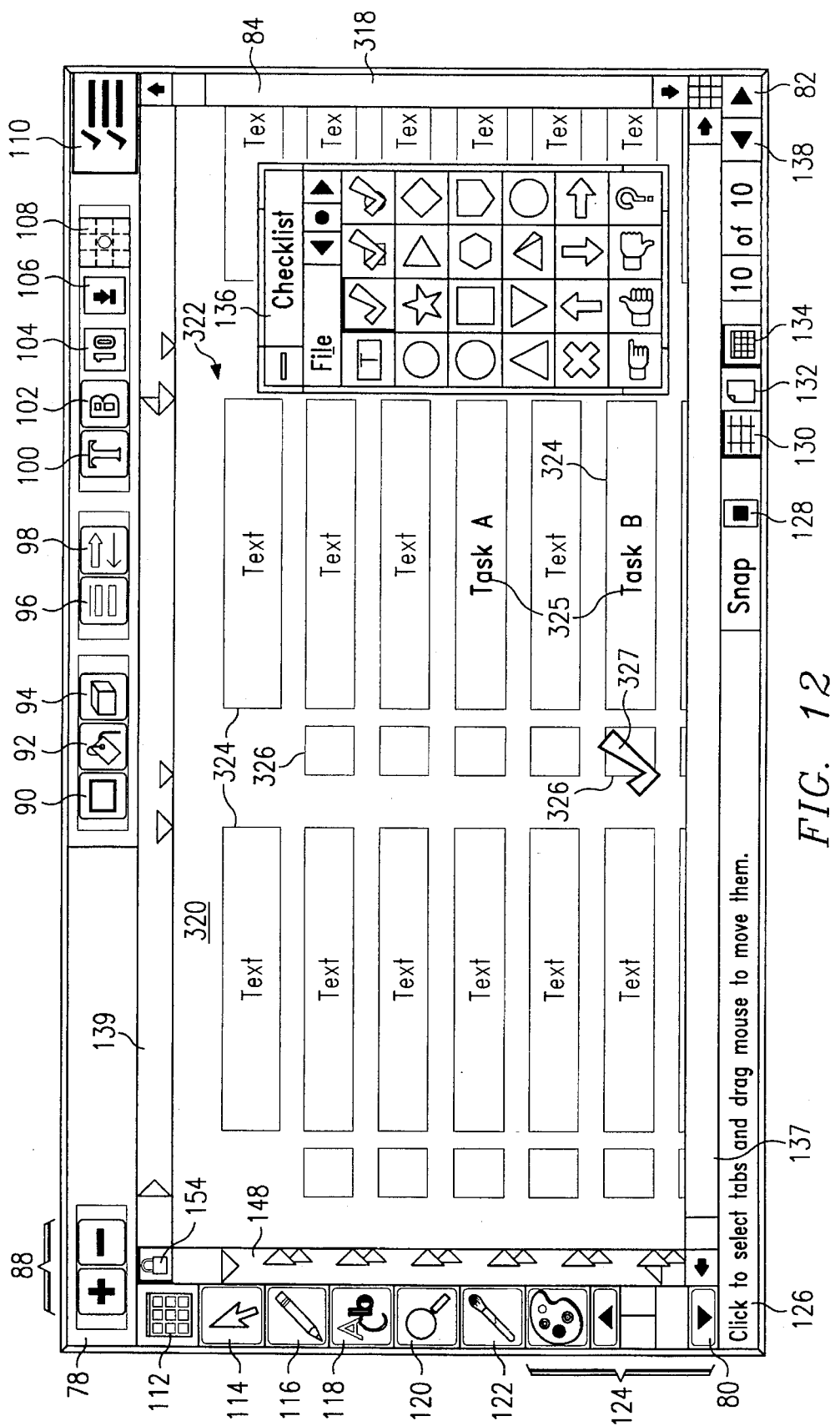
FIG. 12 shows a checklist graphic in accordance with the present invention.

FIG. 12 illustrates checklist chart 318. Checklist chart 318 includes checklist 320 that may be generated by selecting checklist template 36 from template gallery 30 in FIG. 2. Checklist chart 318 includes grid 322 that has text place holders or snap zones 324 and shape place holders or snap zones 326.

Checklist chart 318 uses slidable grids in order to size grid 322 to the desired configuration. The configuration of grid 322 can be modified using slideable grids as previously described. The snap zones in grid 322 provide an example of snap zones where shapes and text will snap to the center of a snap zone within grid 322. These snap zones are preset by the system as it is anticipated that centering on a checklist grid is preferred. It is noted that shape snap zones can be turned off by toggling snap on and off button 128 and the orientation of the text with a snap zone can be modified with text orientation indicator select button 108. Snap zones in chart 318 allow the user of the present system to place shapes, such as check shape 327, as desired within shape snap zones 326 and text within text snap zones 324 with appropriate alignment as shown in FIG. 12.

Figure 13:
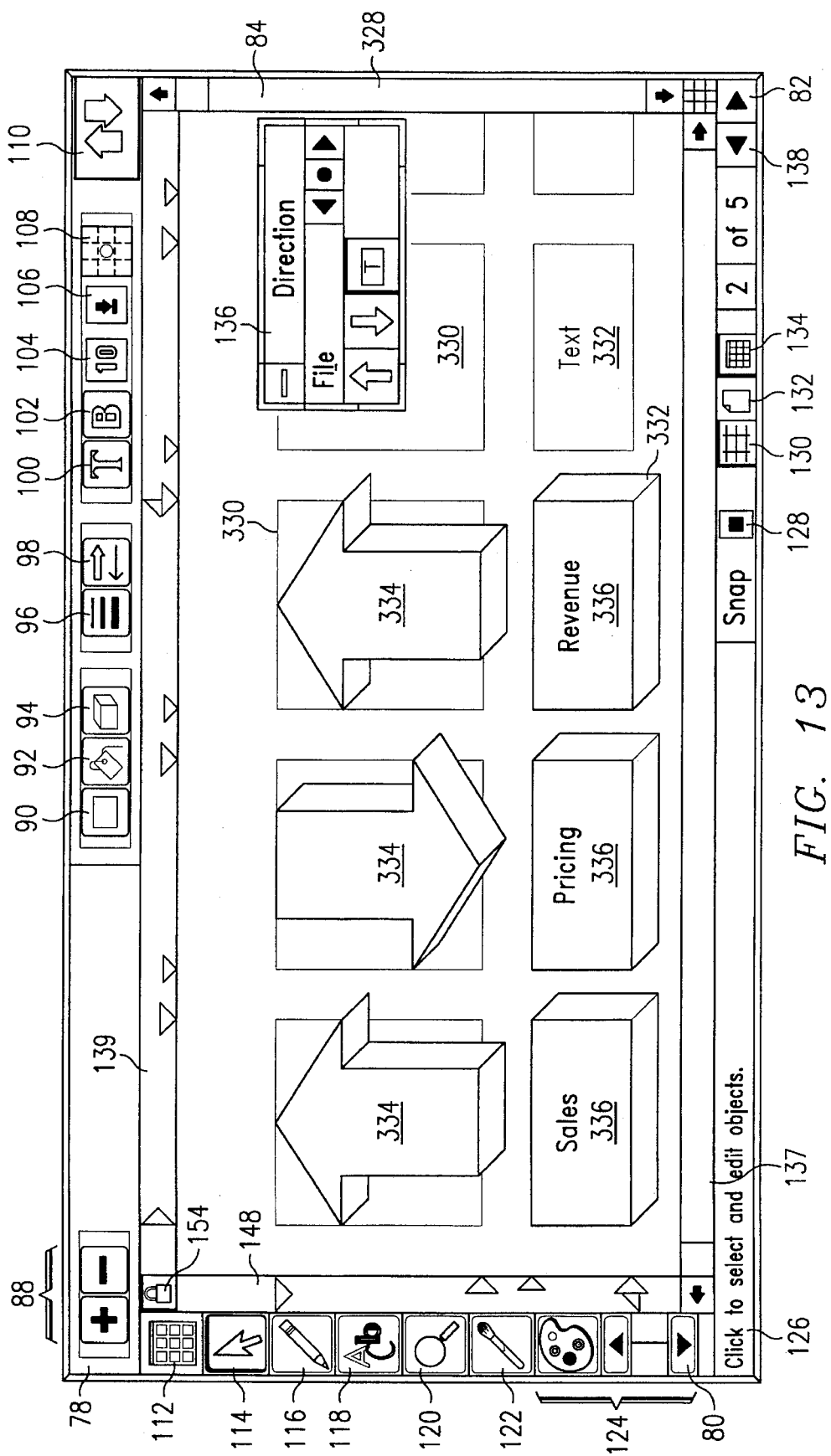
FIG. 13 shows a direction graphic generated in accordance with the present invention.

FIG. 13 depicts direction chart 328 that may be generated by selecting direction template 62 from template gallery 30 in FIG. 2. Direction chart 328 uses shape snap zones or place holders 330 and text snap zones or place holders 332 so that chart 328 can be quickly and cleanly generated. The shape and text place holders can be modified using the slidable grid concept previously discussed above. In FIG. 13, arrow shapes 334 have been placed in snap zones 330 and text 336 has been placed in text place holders 332 to create chart 328.

Figure 14:
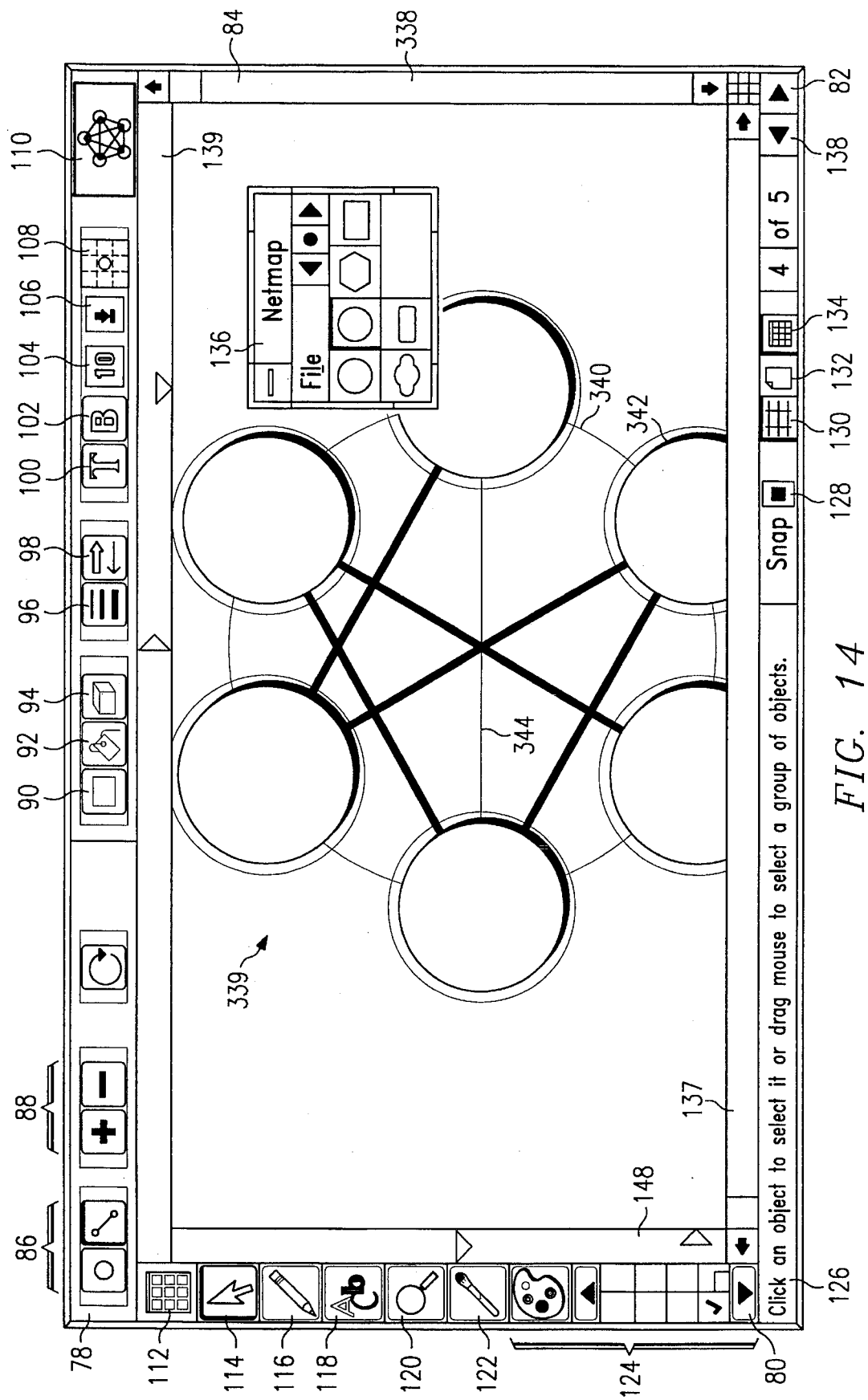
FIG. 14 shows a netmap graphic generated in accordance with the present invention.

FIG. 14 illustrates netmap chart 338 that may be generated by selecting netmap template 66 on template gallery 30 in FIG. 2. Netmap chart 338 includes netmap 339 having placeholder or snap zone 340 including shape snap zones 342 and connection line snap zones 344. Shape snap zones 342 can be filled by selecting shapes from shape palette 136 and placing the shapes in the shape snap zones 342. The shapes within netmap 339 can be connected using line attach buttons 86 to draw lines for connecting the shapes into the desired netmap configuration.

Figure 15:
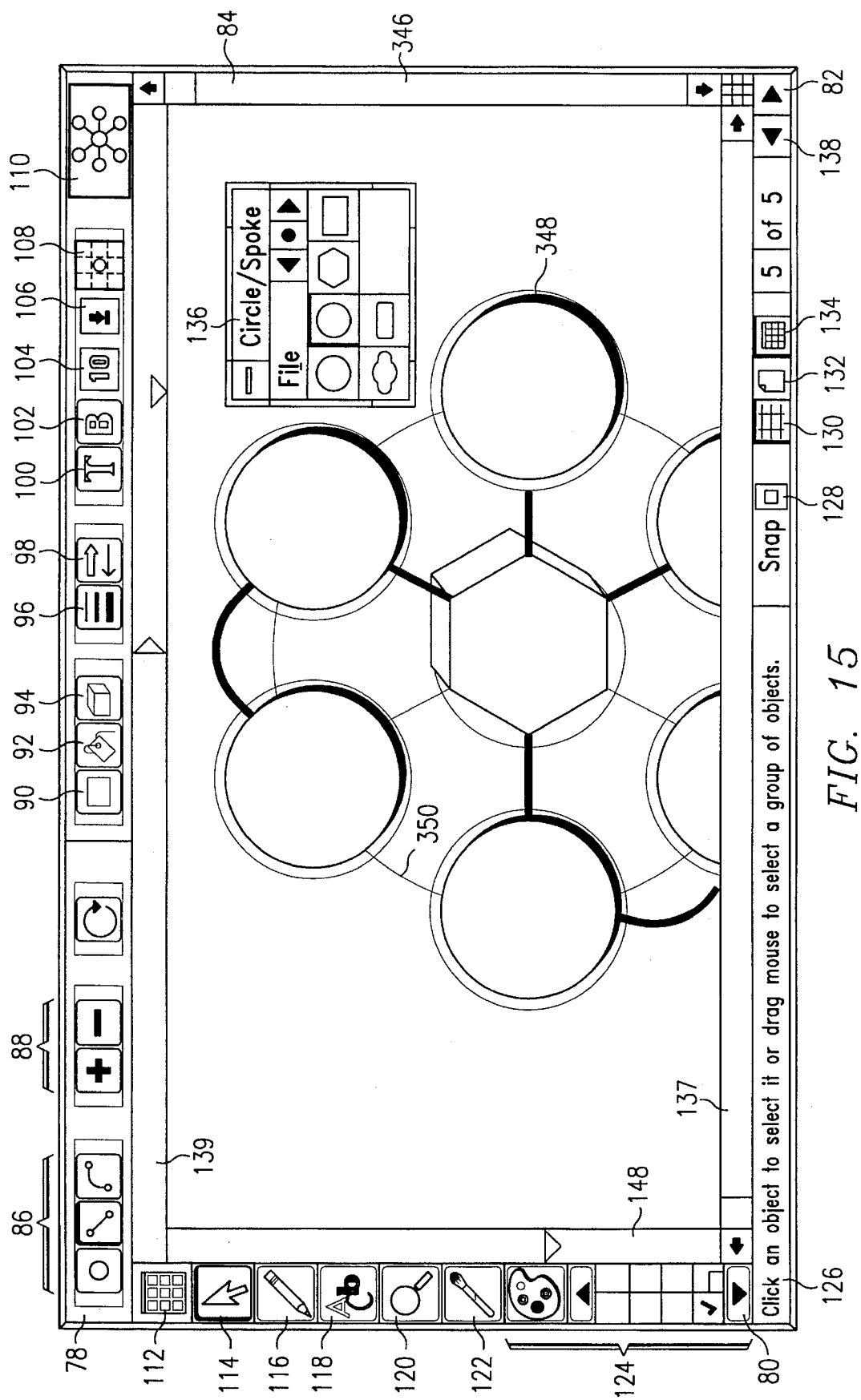
FIG. 15 illustrates a circle/spoke graphic generated in accordance with the present invention.

FIG. 15 illustrates circle/spoke chart 346 that may be generated by selecting circle/spoke template 70 from template gallery 30 in FIG. 2. Circle/spoke chart 346 includes shape snap zones 348 and line snap zones 350 for generating a circle/spoke chart. By appropriately placing shapes within shape snap zones 348 and drawing lines in line snap zones 350, a circle/spoke chart such as chart 346 can be generated efficiently and accurately with the present system.

It is noted that while several examples of the types of graphics that may be generated with the present system have been provided herein, that these examples are not intended in any way to limit the type of graphics that may be generated with the present system. Additionally, the present system is not limited to the graphics templates presented in FIG. 2 as freestyle template 32 and custom template 72 provide the user with all of novel features of the present system without limiting the type of graphics chart to be created.

Although the present invention has been described in detail, it should be understood that various changes, substitutions, and alterations can be made hereto without departing from the spirit and scope of the invention as defined by the appended claims.

What is claimed is:

1. A method for generating computer graphics on a computer display with a computer having a processor, the method comprising the steps of:

generating on the display an adjustable grid associated with each type of graphics chart, each grid providing predetermined placement positions for text and shapes on each type of graphics chart; and providing snap zones associated with each grid for controlling the orientation of the shapes and text placed on the grid.

2. The method of claim 1 wherein spacing in the adjustable grid is controlled by tabs.

3. The method of claim 1 further comprising the step of generating on the display a template gallery presenting choices for the plurality of graphics charts that may be generated on the display, the selection of any one of the templates provides a template chart having a predefined adjustable grid and snap zones configuration associated with the one template.

4. The method of claim 1 further comprising the step of generating on the display a shape palette associated with each type of graphics chart providing a predetermined set of shapes that may be placed on the graphics chart.

5. The method of claim 4 further comprising the step of providing a cycle select between a plurality of shapes selected from the shape palette for placing the shapes on the graphics chart.

6. The method of claim 4 further comprising the step of generating lines between shapes on a graphics chart responsive to commands.

7. The method of claim 4 further comprising the step of automatically routing the lines between related shapes and for maintaining the lines between the related shapes when one or more of the related shapes is moved.

8. The method of claim 4 further comprising the step of automatically placing additional shapes on a graphics chart and for connecting the additional shapes to related shapes previously placed on the graphics chart with a line.

9. The method of claim 4 further comprising the step of generating a plaque attribute for shapes placed on the graphics chart.

10. The method of claim 4 further comprising the step of generating three-dimensional shading for shapes placed on a graphics chart and for ensuring appropriate three-dimensional shading is maintained between overlapping shapes.

11. The method of claim 4 further comprising the step of generating an anchor icon indicating an initiating shape for a new line and a ship icon indicating the destination shape for the new line.

12. The method of claim 4 further comprising the step of moving in unison a plurality of related shapes.

13. The method of claim 4 further comprising the step of displaying in a graphics chart an overlapping region of two shapes as an average color of the two shapes.

14. The method of claim 4 further comprising the step of inserting and deleting additional text and graphics in an existing graphics chart and for inserting and deleting additional regions in the graphics chart's grid as required to insert and delete additional text and graphics.

15. A computer system for generating a plurality of types of graphics charts on a computer display, the system comprising:

a processor for executing a plurality of computer instructions;

a display for showing the graphics charts;

a memory device for storing the computer instructions;

input devices for inputting commands to the processor and for manipulating the graphics charts on the display; and wherein the computer instructions further comprises, instructions for generating an adjustable grid associated with each type of graphics chart, each grid providing predetermined placement positions for test and shapes on each type of graphics chart, and instructions for generating snap zones associated with each grid for controlling the orientation of the shapes and text placed within the grid.

16. The computer system of claim 15 wherein spacing in the adjustable grid is controlled by tabs.

17. The computer system of claim 15 wherein the computer instructions further comprise instructions for generating a template gallery presenting choices for the plurality of graphics charts that may be generated with the program, the selection of any one of the templates provides a template chart having a predefined adjustable grid and snap zones configuration associated with the one template.

18. The computer system of claim 15 wherein the computer instructions further comprise instructions for generating a shape palette associated with each type of graphics chart providing a predetermined set of shapes that may be placed on the graphics chart.

19. The computer system of claim 18 wherein the computer instructions further comprise instructions for implementing a cycle select between a plurality of shapes selected from the shape palette for placing the shapes on the graphics chart.

20. The computer system of claim 18 wherein the computer instructions further comprise instructions for generating lines between shapes on a graphics chart.

21. The computer system of claim 18 wherein the computer instructions further comprise instructions for automatically routing the lines between related shapes and for maintaining the lines between the related shapes when one or more of the related shapes is moved.

22. The computer system of claim 18 wherein the computer instructions further comprise instructions for automatically placing additional shapes on a graphics chart and for connecting with a line the additional shapes to related shapes previously placed on the graphics chart.

23. The computer system of claim 18 wherein the computer instructions further comprise instructions for generating a plaque attribute for shapes placed on the graphics chart.

24. The computer system of claim 18 wherein the computer instructions further comprise instructions for generating three-dimensional shading for shapes placed on a graphics chart and for ensuring appropriate three-dimensional shading is maintained between overlapping shapes.

25. The computer system of claim 18 wherein the computer instructions further comprise instructions for generating an anchor icon indicating an initiating shape for a new line and a ship icon indicating the destination shape for the new line.

26. The computer system of claim 18 wherein the computer instructions further comprise instructions for moving in unison a plurality of related shapes.

27. The computer system of claim 18 wherein the computer instructions further comprise instructions for displaying in a graphics chart an overlapping region of two shapes as an average color of the two shapes.

28. The computer system of claim 18 wherein the computer instructions further comprise instructions for inserting and deleting additional text and graphics in an existing graphics chart and for inserting and deleting additional regions in the graphics chart's grid as required to insert and delete additional text and graphics.

* * * * *